United States Patent Office.

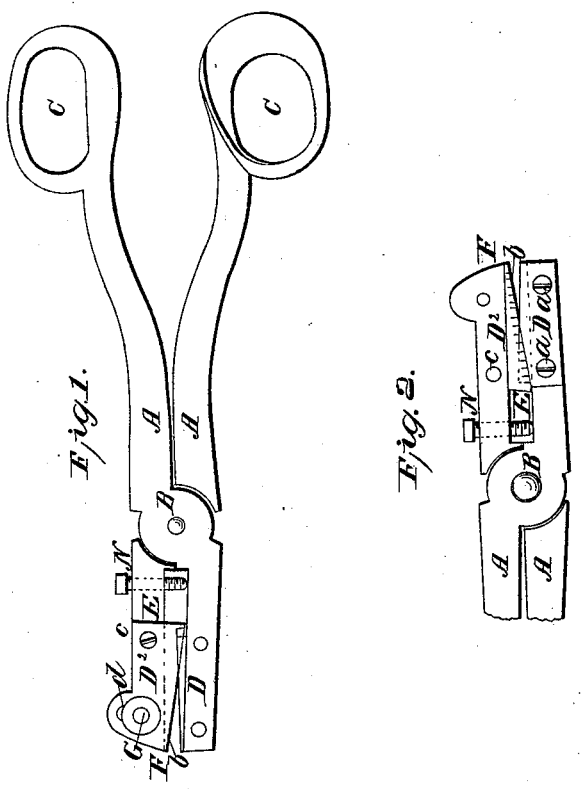

CHARLES N. CUTTER, OF WORCESTER, MASSACHUSETTS.

*Letters Patent No. 60,700, dated January 1, 1867.*

IMPROVEMENT IN BUTTON-HOLE CUTTERS.

*The Schedule referred to in these Letters Patent and making part of the same.*

TO ALL WHOM IT MAY CONCERN:

Be it known that I, CHARLES N. CUTTER, of Worcester, in the county of Worcester, and State of Massachusetts, have invented a new and improved Button-Hole Cutter; and I do hereby declare that the following is a full, clear, and exact description thereof, which will enable others skilled in the art to make and use the same, reference being had to the accompanying drawings, forming part of this specification.

The present invention relates to a new implement for the cutting of button-holes in garments of all kinds; the invention consisting in so constructing the cutter that it can be adjusted with the utmost accuracy and readiness to the cutting of button-holes of varying and different sizes.

In the accompanying plate of drawings, my improved button-hole cutter is illustrated—

Figure 1 being a plan view of the under side of the same; and

Figure 2, a similar view, but of the upper side.

Similar letters of reference indicate like parts.

A A, in the drawings, represent the two arms or blades of the cutter, which are pivoted together at B, and having finger openings, C, at one end, substantially similar to the ordinary and common scissors or shears. Both of these arms or blades A have attached to them cutting blades, D $D^2$, in such a manner, that by the opening and closing of the shears or cutter arms, B, they will pass by each other, and one over the other, so that if a piece of cloth or other suitable material be placed in and between the said cutter blades, when they are open from each other, by then shutting or closing the same, they will cut the said cloth in a line and direction corresponding to that of the said cutting edges or blades. One of these cutter blades, D, is secured to its arm, A, by means of screws, $a$, or in any other proper manner, while the other, $D^2$, is graduated along its edge, $b$, upon its upper side, and is hung at its inner end upon a pivot, $c$, so as to swing, while at its outer end, F, is a slot, $d$, through which passes a thumb or set-screw, G, screwing into the cutter arm, A, to which such blade is secured. By means of the graduated edge of one of the cutter plates, and the manner in which it is hung, it is plain to be understood that it can be so set or adjusted as to enable a button-hole slit to be cut either more or less in length, according as may be desired. N, a set-screw, passing through one of the cutter arms, A, at its rear end, by means of which the cutter is made to answer the purpose of a movable knife with stationary cutter blades or plates.

What I claim as new, and desire to secure by Letters Patent, is—

The cutter blade D, adjustable graduated cutter blade $D^2$, pivot $c$, set-screw G, and slot $d$, in combination with the handles A A, and screw N, so that a button-hole may be cut any length without measuring, substantially as herein set forth.

CHARLES N. CUTTER.

Witnesses:
 E. B. STODDARD,
 B. M. HARRINGTON.